Patented June 3, 1952

2,599,326

UNITED STATES PATENT OFFICE 2,599,326

DECOMPOSITION OF COMPLEX METAL PHOSPHATE SALTS

Dieter M. Gruen and Joseph J. Katz, Chicago, Ill., assignors to the United States of America as represented by the United States Atomic Energy Commission No Drawing. Application June 19, 1951, Serial No. 232,466

9 Claims. (Cl. 23—140)

The process of the present invention is concerned with a method of decomposing complex metal phosphate salts and recovering the metal values substantially free of phosphorus. The process is particularly concerned with the recovery of the titanium subgroup metals from complexes of said metals with phosphorus oxychloride and phosphorus pentachloride.

The term "titanium subgroup metals" or "IV-B subgroup metals" as used in this specification and claims refers to the three elements of the IV-B subgroup of the periodic table, namely, titanium, zirconium and hafnium.

Zirconium is a metallic element having many hnghly desirable characteristics. It has a very high melting point, a specific gravity approximately 20% less than plain carbon steel, and excellent corrosion characteristics. Moreover, it is comparatively abundant. It is, however, rather difficult to recover pure zirconium from zirconium ores. One of the chief difficulties encountered in such recovery is the problem of separating zirconium from the hafnium with which nearly all natural zirconium is associated. One method of separating zirconium from hafnium is a volatility type of process in which the phosphorus oxychloride or phosphorus pentachloride complexes of zirconium and hafnium are separated by fractional distillation. One disadvantage of this process, however, is the difficulty of recovering the zirconium or the hafnium from the resultant enriched metal complex distillate or residue in a state sufficiently free of phosphorus that it may be readily converted to a phosphorus-free metallic state.

It is an object of the present invention to provide a method for recovering the titanium subgroup metal values from phosphorus chloride and phosphorus oxychloride complex salts of said metals.

It is an additional object of the present invention to provide a method of recovering zirconium in a substantially phosphorus-free state from complexes containing zirconium, chlorine, phosphorus and oxygen.

It is an additional object of the present invention to provide a method of decomposing complex salts of hafnium, phosphorus and chlorine and the recovery of hafnium values substantially free of phosphorus.

Other objects will be apparent from the following detailed description.

The process of recovery of the group IV-B metals from phosphorus chloride and phosphorus oxychloride complexes of these metals depends primarily upon the decomposition of these complex salts by reaction of the salts with a monohydric alcohol. The process of the present invention comprises broadly reacting a group IV-B metal phosphorus oxychloride complex salt with a monohydric alcohol having less than five carbon atoms, then dissolving the reaction mixture in water, and recovering the group IV-B metal from the solution by precipitating the metal as the hydroxide. The metal values are thus recovered in a form substantially free of phosphorus.

While we do not wish to be bound by any theory advanced, it is believed that the present process operates upon the principle of using the IV-B metal phosphorus chloride or oxychloride complex as a phosphorylating agent for the formation of an organic phosphate with the monohydric alcohol. This organic phosphate binds the phosphorus so strongly as to prevent precipitation of the phosphorus during the subsequent dissolution of the metal salt in water and its precipitation and recovery as the metal hydroxide. In any event, it is essentiol that the step of reacting the alcohol with the complex salt and the steps of dissolution of the alcohol-complex salt mixture in water be carried out in that order.

The process of the present invention is applicable to the recovery of titanium, zirconium or hafnium from complexes of these metals with phosphorus oxychloride or phosphorus pentachloride. The process which is essentially the same for the recovery of all three metals is illustrated by the following description of the recovery of zirconium.

The zirconium-phosphorus oxychloride complex is a dark green substance having a melting point of approximately 100° C. and a boiling point of approximately 360° C. The molecular formula is $3ZrCl_4 \cdot 2POCl_3$. The pentachloride complex which is believed to have the formula $$3ZrCl_4 \cdot 2PCl_5$$

has somewhat higher melting and boiling points, the melting point being approximately 165° C. and the boiling point approximately 412° C. The first step of the present process comprises contacting the complex with a monohydric alcohol having less than five carbon atoms. Representative examples of suitable alcohols are methyl, ethyl, n-propyl, isopropyl and n-butyl alcohols. The use of absolute alcohol is preferable, but not essential. It has been found that contacting the two reagents in a liquid state gives the most satisfactory reaction. This involves maintaining the oxychloride complex at a fairly high temperature until contact with the alcohol is made since the complex has a melting point greater than 100° C. as previously mentioned. The alcohols and particularly the lower alcohols, however, are very volatile. Considerable care must therefore be exercised to prevent the excessive volatilization of the alcohol during mixing with the complex salt. One method of preventing excessive volatilization is to cool the alcohol before and during mixing so that the temperature of the mixture will be maintained below the boiling point of the alcohol. The hot complex should also be added sufficiently slowly that the boiling point of the alcohol is not exceeded in spite of the cooling of the alcohol. Since the higher alcohols have higher boiling points, less rigid control is required when the propyl and butyl alcohols are used. In general, however, methyl and ethyl alcohol give the most satisfactory yields. The amount of alcohol required to carry out this step of the process can be calculated from the following equation:

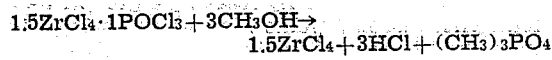

1.5ZrCl₄·1POCl₃ + 3CH₃OH →
1.5ZrCl₄ + 3HCl + (CH₃)₃PO₄

Greater than stoichiometric amounts of the alcohol, however, are usually used in order to insure complete reaction.

Following the completion of the reaction between the alcohol and the complex salt, the mixture is dissolved in water and the zirconium is precipitated as the hydroxide. The hydroxyl ion is usually furnished by the introduction of ammonium hydroxide into the water either before, during or after the step of dissolving the alcohol-complex salt mixture in the water. Ammonium hydroxide is a preferable reagent since any ammonia carried by the precipitate will be removed from the precipitate by subsequent heating whereas if sodium or potassium hydroxide is used, the corresponding zirconate will be formed and additional steps will be required to remove the sodium or potassium. It is desirable to carry out the precipitation immediately after the dissolution of the alcohol-salt mixture in the water since hydrolysis of the alkyl phosphate may occur on standing. This may result in some phosphorus contamination of the zirconium hydroxide when it is subsequently precipitated and removed from the solution. Stoichiometric or greater quantities of the hydroxide may be used to precipitate the zirconium in accordance with the following molecular formula:

ZrCl₄ + 4NH₄OH → Zr(OH)₄ + 4NH₄Cl

Now that the process of the present invention has been broadly described, the invention will be further illustrated by reference to the following examples.

*Example I*

Ten grams of molten 3ZrCl₄·2POCl₃ were added to a flask containing 25 ml. of absolute ethyl alcohol. The flask was cooled and the complex was added sufficiently slowly so that the temperature of the reaction mixture did not rise above 70° C. A vigorous reaction ensued resulting in a turbid liquid phase. Twenty-five ml. of water were then added to the flask. A 15-ml. quantity of 6 N NH₄OH was added to the flask and the resultant flocculent precipitate of zirconium hydroxide was then removed from the mixture by centrifugation. This precipitate was dissolved in nitric acid and tested for phosphate with ammonium molybdate reagent. The test was negative indicating that if any phosphorus was present, it was present in a concentration below the sensitivity of this test.

*Example II*

Seven and one-half liters of n-propyl alcohol was cooled to −5° C. and 1518 g. of molten 3ZrCl₄·2POCl₃ was added directly to the alcohol over a period of two minutes with constant stirring. The temperature of the mixture rose to 70° C. during this time. The solution was then cooled to 20° C. and an additional 1055 g. of molten complex was added over a five-minute period, during which time the temperature of the mixture rose to 75° C. The alcohol solution was then diluted with 26.5 liters of hot water and ammonium hydroxide in quantity sufficient to give a permanent orange color with methyl red in the mixture was added to the water. This resulted in a precipitate of zirconium hydroxide which was filtered from the solution and then washed.

*Example III*

A portion of 13.2 kg. of molten 3ZrCl₄·2POCl₃ was slowly transferred to a cooled flask containing 12 liters of anhydrous methyl alcohol sufficiently slowly that violent reaction was prevented; the time required for the addition was about fifteen minutes. The mixture was then transferred to a barrel containing 75 liters of distilled water at a temperature of 60° C. with constant agitation. Seven and one-half liters of aqua ammonia was then added to the container. The contents were then checked with methyl red indicator which turned yellow indicating a slight excess of ammonia. The precipitate formed was allowed to settle and the supernatant decanted. The precipitate was then washed three times with distilled water and finally separated by filtration.

The steps of the process when applied to the dissolution of a group IV-B phosphorus pentachloride complex and recovery of the group IV-B metal in a phosphorus-free state are the same as those set forth above for the dissolution of a phosphorus oxychloride complex.

The above detailed description is given for purposes of illustration and specific details thereof are not intended to limit the scope of the invention which is to be limited only by the following claims.

What is claimed is:

1. The method of recovering titanium subgroup metal values from a phosphorus oxychloride complex of said metal, which comprises reacting said complex with a monohydric alcohol containing less than five carbon atoms, dissolving said reaction mass in water, introducing a source of hydroxyl ions into said solution whereby said titanium subgroup metal is precipitated as the hydroxide, and recovering said precipitate.

2. The process of claim 1 wherein the titanium subgroup metal is titanium.

3. The process of claim 1 wherein the titanium subgroup metal is zirconium.

4. The process of claim 1 wherein the titanium subgroup metal is hafnium.

5. The process of claim 1 wherein said monohydric alcohol is methyl alcohol.

6. The process of claim 1 wherein said monohydric alcohol is ethyl alcohol.

7. The process of claim 1 wherein said monohydric alcohol is isopropyl alcohol.

8. The process of recovering zirconium values in a substantially phosphorus-free state from the complex salt $3ZrCl_4 \cdot 2POCl_3$, which comprises reacting said salt with a monohydric alcohol having less than five carbon atoms, dissolving said reaction mixture in an aqueous hydroxyl containing solution, and recovering the zirconium hydroxide precipitate thus formed.

9. The process of recovering zirconium values from a zirconium-phosphorus oxychloride complex salt, which comprises reacting said salt in the molten state with anhydrous methyl alcohol while maintaining the reaction temperature below the boiling point of said alcohol, dissolving said reaction mixture in water and contacting the resultant solution with aqua ammonia whereby zirconium hydroxide is precipitated, and recovering said precipitate.

DIETER M. GRUEN.
JOSEPH J. KATZ.

No references cited.